Sept. 15, 1936.  R. C. BURT  2,054,570
POWER PLANT
Filed July 9, 1934   2 Sheets-Sheet 1

INVENTOR:
Robert C Burt

Sept. 15, 1936.   R. C. BURT   2,054,570
POWER PLANT
Filed July 9, 1934   2 Sheets-Sheet 2

Inventor:
Robert C Burt

Patented Sept. 15, 1936

2,054,570

UNITED STATES PATENT OFFICE 2,054,570

POWER PLANT

Robert C. Burt, Pasadena, Calif.

Application July 9, 1934, Serial No. 734,336

7 Claims. (Cl. 60—62)

My invention relates to packing and lubrication systems for compressor installations and more particularly those in which the compressor is a part of a closed fluid transmission circuit. Such a fluid transmission circuit comprises a compressor pumping compressible fluid, generally air, into a tank from which it passes to drive a motor. The compressible fluid then returns to a second tank from which it is taken by the compressor and pumped again into the high pressure tank, etc.

An object of my invention is to provide an oil packing system in which, if leaks should occur, only oil will leak out and will then be returned to a reservoir to be used again. Another object is to provide a system which shall be pressure packed with oil even when the compressor is idle. A further object is to provide lubrication for all the parts of compressor and motor of a compressible fluid transmission without the possibility of passing "slugs" of oil through these units.

With these and other objects in view, the invention consists in certain novel features of construction, as hereinafter shown and described and then specifically pointed out in the claims; and in the drawings illustrative of the preferred embodiment of the invention.

Figure 1:
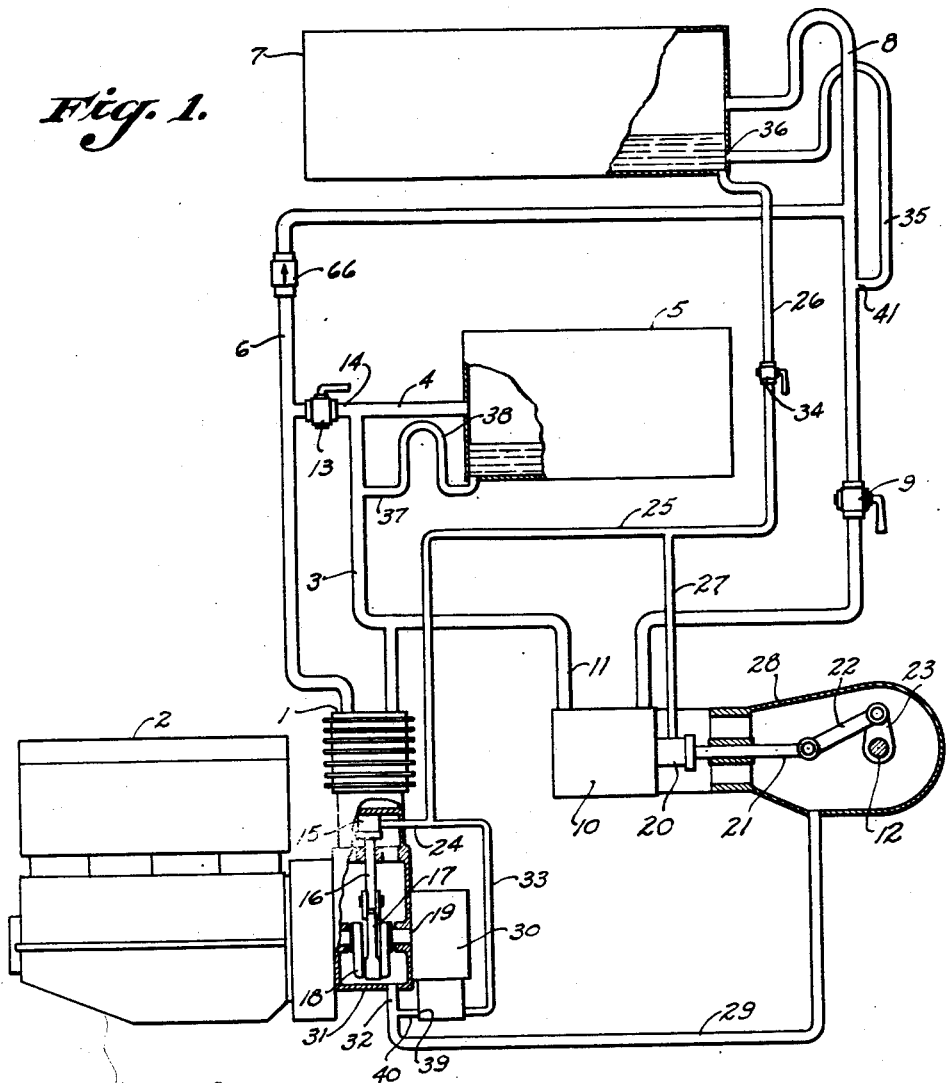
Fig. 1 is a drawing showing the application of the invention to a compressible fluid transmission system.

Referring now to the drawings, 1 is a compressor driven by engine 2. Any source of mechanical power, such as an electric motor, turbine, etc., could, of course, be employed in place of the engine 2. The compressor 1 takes compressible fluid through pipes 3 and 4 from low pressure reservoir 5 and compresses it through pipes 6 and 8 into high pressure reservoir 7. The compressible fluid passes out of the high pressure reservoir 7 through pipe 8 and throttle valve 9 to fluid motor 10. The exhaust from the fluid motor is by way of pipe 11 which connects to pipe 3 and through pipe 4 to tank 5. Thus the compressor and fluid motor form a closed fluid circuit, the compressor having its intake connected to the exhaust of the motor. When the compressor is run, pressure builds up in the tank 7 which is then available for driving the motor 10 to do work on the shaft 12. The speed of motor 10 is controlled by the throttle 9. The pressure in tank 7 may be controlled manually or automatically by starting or stopping the engine 2 or by opening and closing the valve 13 in the pipe 14. The pipe 14 short-circuits the compressor when the valve 13 is open by connecting the compressor 10 discharge with the compressor intake. When the valve 13 is open, then the compressor no longer continues to build up fluid pressure in the tank 7 and the compressor is substantially unloaded. Check valve 66, permitting fluid to flow only in the direction from the compressor 1 toward pipe 8, will prevent the passage of fluid from tank 7 into tank 5 when valve 13 is open. The low pressure tank 5 and the high pressure tank 7 have sufficient capacity to avoid large pressure changes in the circuit.

This closed circuit of compressor driven by a source of mechanical power, high pressure reservoir, motor, and low pressure reservoir constitutes a fluid transmission system of marked superiority. Power can be transmitted with an infinitely variable mechanical advantage while at the same time it is possible to operate the engine-compressor unit under conditions conducive to the best efficiency of the engine. The closed circuit with motor exhausting into the chamber from which the compressor takes its air has many advantages. As is pointed out in my copending patent application, Serial No. 539,966, the closed circuit eliminates overheating of the exhaust from the compressor, freezing of the exhaust from the motor, and makes possible huge outputs of power from relatively small equipment, especially when the compression and expansion ratios are made about 3.

Compressor 1 has a stuffing box 15 through which passes a piston rod 16 driven by the connecting rod 17 on the crank 18 of shaft 19 which is coupled to the shaft of the engine 2. Likewise, motor 10 has stuffing box 20 through which passes piston rod 21 connected to connecting rod 22 on crank 23 of shaft 12.

Figure 2:
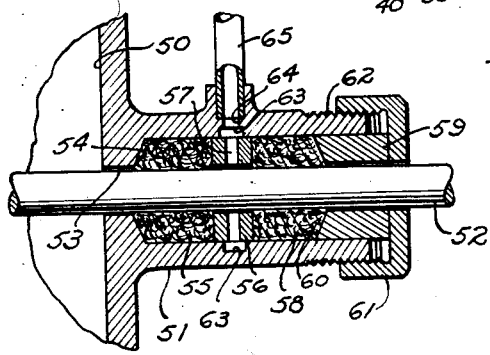
Fig. 2 is a detail view of a stuffing box as used on the compressor and motor of the compressible fluid transmission.

Stuffing boxes 15 and 20 are similar in construction. A detail of this type of box is shown in Fig. 2. 50 is the cylinder wall of compressor or motor. From the end of the cylinder extends a cylindrical tube 51. A piston rod passes through the tube and through a closely-fitting hole 53 in the cylinder wall to a piston in the cylinder. The end of the recess formed by the inside of the tube 51 has conically sloping sides 54. Into the recess in the tube 51 and around the rod 52 is pressed packing material 55 such as asbestos fibres, lead shavings and graphite. A lantern ring 56 is next slipped over the piston rod into the recess in tube 51 and against the packing 55. This ring has bored in it a large number of holes 57 bored around the circumference and running from the outside of the ring through to the hole through which passes the piston rod. More packing 58 is inserted, followed by the gland 59 which may have a conical face 60 bearing against the packing. A nut 61 is screwed on the threaded end 62 of the tube 51 until the packing is made sufficiently tight to effectively prevent leakage from the cylinder 50. The tube 51 has cut in its inner surface a circular groove 63. A hole 64 connects this groove with a pipe 65 which is held by a pressure tight connection to the tube 51.

My system of packing and lubrication contemplates sealing against leakage of the compressible power fluid by maintaining oil under pressure in the lantern ring 56 and around the piston rod 52. Oil under pressure is forced into the stuffing box through pipe 65, hole 64, groove 63, and holes 57. The packing 58 serves to pack the box against leakage of oil to the outside. The pressure of oil is equal to or greater than the pressure of compressible fluid in the cylinder 50; hence there is no tendency for compressible fluid to pass out of the cylinder along the piston rod. Any leakage which takes place must be leakage of oil either into the cylinder or into the crank case. With compressible fluids such as air, the leakage of air would be very much greater through the same packing without an oil seal than would be the leakage of oil with an oil seal. Furthermore, the oil lubricates the rod as it slips through the packing and reduces friction and causes the packing to have longer life. This type of packing, therefore, is very advantageous.

The compressor stuffing box, being constructed after the manner of that shown in Fig. 2, receives oil through pipes 24, 25, and 26 from the bottom of tank 7 which acts as an oil reservoir. Fluid motor stuffing box 20 receives oil through pipes 27 and 26 also from tank 7. The oil leaking out of stuffing box 20 runs into the crank case 28 of motor 10 and thence through pipes 29 and 40 to the intake 39 of oil pump 30 which is the lowest point of the equipment. Likewise, the oil leaking through stuffing box 15 of the compressor runs into the compressor crank case 31 and out through pipe 32 to pipe 40 and thence into the intake of the oil pump 30. The oil pump 30 pumps the oil back into the high pressure oil line 25 through pipe 33. The oil thus pumped back may go to the stuffing boxes, or if the quantity is more than can be absorbed in this manner, it can return to the high pressure tank 7. The shaft of the oil pump 30 is coupled to the compressor shaft and runs whenever the engine and compressor run.

Figure 3:
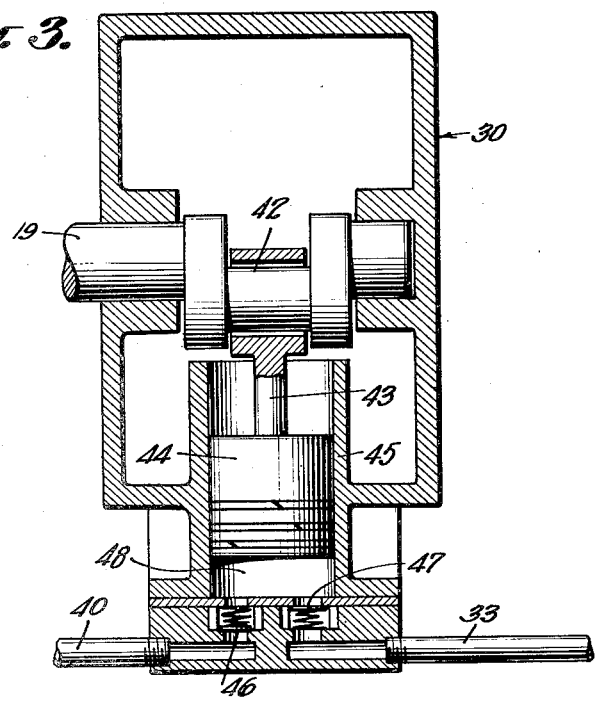
Fig. 3 is a cross sectional view of an oil pump having large clearance volume which is employed to pump oil back into the high pressure system.

The oil pump 30 is constructed with a rather large clearance volume, so large that when there is no more oil to pump and the pump takes in air from the crank-cases, the air will not be discharged into the high pressure line 33, but will merely undergo compression and re-expansion. In a pump designed for handling oil there will naturally be some leakage when pumping air which will permit the pump to take in oil on the suction stroke if there is any oil available for pumping. The introduction of any oil into the pump cylinder is equivalent to decreasing the clearance volume and discharge results when the pressure in the pump is built up to the pressure in line 33. The cylinder of pump 30 is at the bottom of the pump and the discharge port connecting to pipe 33 is at the bottom of the cylinder, so that any oil entering the cylinder will immediately cover the discharge port and will be first to be discharged into the high pressure line. It will be observed that the oil pump discharges into an oil line and not into the fluid tank, which means that, on standing, any leak through the pump will be of oil and not of fluid. Any leakage of oil past the piston of the pump 30 passes into the pump crank-case and thence into the compressor crank-case with which it connects. A detailed cross sectional view of the pump 30 is shown in Fig. 3. The continuation of the compressor shaft 19 is journaled in the pump casing and carries a crank 42 which moves a connecting rod 43 and attached piston 44. The piston 44 moves in cylinder 45, taking in oil through the pipe 40 and intake valve 46 and discharging it through exhaust valve 47 and conduit 33. The piston is shown in the drawings as being at the end of its downward stroke and the large clearance volume existing below the piston head is distinctly visible. It is this clearance volume which makes it impossible for the pump to pump air under high pressure while not affecting its ability to pump oil under high pressure.

Figure 4:
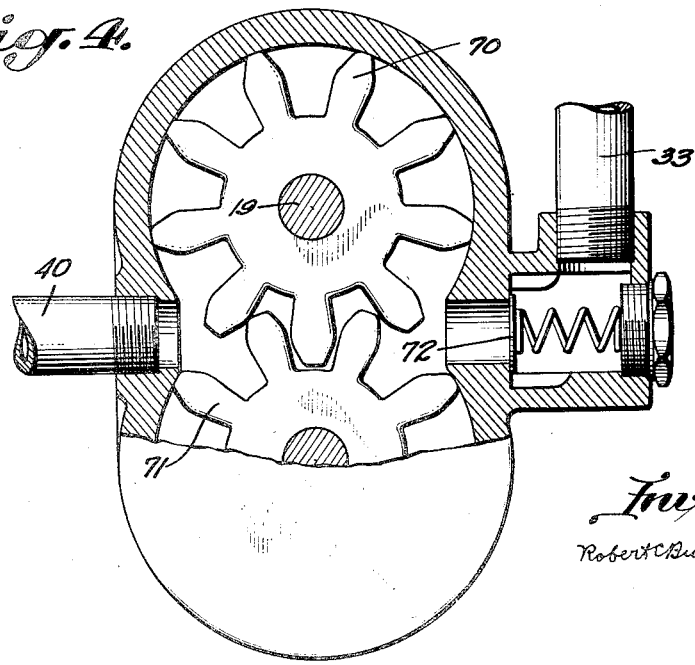
Fig. 4 is a drawing partly in section of a gear pump employed to pump oil back into the high pressure system.

Instead of a large clearance pump, a pump of the gear type or a rotary pump may be employed for the pump 30. Pumps of these types will not pump compressible fluids like air to high pressures because of the inevitable leakage due to the very poor seal between moving parts; they will, however, pump oil to high pressures because the viscosity of the oil is so high as to make the oil seal itself. A pump of the gear type is shown in Fig. 4. This pump has a casing in which are two substantially cylindrical cavities joining one another. In one cavity a gear 70 is rotated on a continuation of the compressor shaft 19. Meshing with gear 70 is gear 71. As the gears are rotated in directions consistent with rotation of gear 70 in a counter-clockwise direction, oil trapped between the gear-teeth is moved from the left side of the casing to the right side. Thus oil is drawn in through the conduit 40 and is forced through the spring-loaded check valve 72 and conduit 33 into the high pressure line.

It will be observed that the pressure of compressible fluid in the power circuit can never be greater than the pressure of oil sealing the stuffing boxes; hence there is no condition in which a leak of the compressible power fluid can occur through the stuffing boxes unless all the oil is first exhausted. It is important to note that the oil is always under pressure and is available for sealing the stuffing boxes even under shut-down conditions. To prevent the continuous leakage of oil from the high pressure tank on long standing, a valve 34 is placed in the oil line 26.

The pistons and cylinders of the compressor and motor require lubrication and this is accomplished by circulating oil in the closed power circuit along with the compressible fluid. Thus, pipe 35 at one end is connected to tank 7 at point 36 near the bottom of the tank and at the other end joins the compressible fluid conduit 8. Each of the pipes 8 and 35 is formed with a gooseneck near where it enters the tank 7 to prevent oil from the tank from running out through these pipes. It is very important to prevent this from happening because if the pipe 8 fills with oil when the throttle 9 is closed, the motor 10 will not run smoothly when the throttle is opened. To insure that no slugs of oil will pass from the tank 7 into pipe 8, the oil is taken from the tank through pipe 35 and only joins pipe 8 at point 41 after some distance from the tank. The oil cannot run out by gravity through pipe 35 and can only be drawn out by the difference in compressible fluid pressure at the two ends of pipe 35, resulting from the passage of compressible fluid from tank 7 along pipe 8. To increase the pressure difference available for sucking oil into pipe 8, a venturi may be placed in pipe 8 at point 41 with the pipe 35 connected to the throat of the venturi.

If the oil in tank 7 then stands higher than the inlet 36 to pipe 35, oil will be drawn over the gooseneck in pipe 35, into pipe 8 and thence into the compressible power fluid circuit where it can lubricate the moving parts. The inlet 36 is placed a little above the bottom of the tank 7 because it is desired that only a limited amount of oil be introduced into the power circuit. When the level of oil in tank 7 has dropped to point 36, no more oil will pass into the power circuit; but there will still be a supply of oil left for pressure oil sealing of the stuffing boxes.

The tank 5 may have oil settle in it and it is necessary to draw the oil out without the possibility of slugs of oil passing into the compressor. To accomplish this, the pipe 37 is connected at one end to the bottom of the tank 5 and at the other end to the pipe 3. The pipe 37 has in it near its entrance to the tank a goose-neck 38 which prevents the flow of oil by gravity from the tank 5. Only when compressible fluid is flowing out of the tank through pipes 4 and 3 does oil flow out through the pipe 37; and this occurs because of the pressure difference between the two ends of the pipe 37 incident to the flow of compressible fluid in pipes 4 and 3. The oil enters the compressor and passes with the power compressible fluid into the high pressure tank where some of it again passes into the power circuit as has already been described.

Thus it is seen that I have produced a means of packing and lubrication of systems under pressure which makes all leaks from stuffing boxes, leaks of oil instead of the compressible fluid under pressure and maintains this condition as long as there is compressible fluid pressure tending to cause leaks; lubrication of fluid compressor and fluid motor, etc., is effected as a part of this system; means are provided for the continuous operation of the system without interference with the compressible fluid circuit.

Having thus described my invention, what I claim as new and desire to secure by Letters Patent is:

1. In a closed pressure compressible fluid transmission circuit including a compressor driven by a source of mechanical power and a compressible fluid motor with the compressor discharge connected to the motor intake and the motor exhaust connected to the compressor intake, and a reservoir connected to the high pressure side of said compressible fluid circuit, said compressor and motor being provided with stuffing boxes packing piston rods, means for preventing leakage of compressible fluid from the stuffing boxes of said compressor and said motor comprising packing in said stuffing boxes, means for admitting oil through said packing of said compressor stuffing box to the piston rod of said compressor, means for admitting oil through said packing of said motor stuffing box to the piston rod of said motor, oil in said high pressure reservoir, piping connecting the oil-bearing portion of said reservoir with the above-mentioned means for admitting oil through the packings of said stuffing boxes, and a pump adapted to pump back into said reservoir the oil that leaks from said stuffing boxes.

2. In a compressible fluid pressure system including a stuffing box packing a rod and a reservoir connected to the compressible fluid pressure system to store said compressible fluid, means for preventing leakage of compressible fluid from said stuffing box comprising packing in said stuffing box, means for admitting oil through said packing to said rod, oil in said reservoir, a pipe connecting the oil-bearing portion of said reservoir with said means for admitting oil through said packing, and a pump adapted to pump back into said reservoir the oil that leaks from said stuffing box, said pump having so large a clearance volume that it is incapable of pumping air into said reservoir against the fluid pressure existing there.

3. In a compressible fluid pressure system including a stuffing box packing a rod and a reservoir connected to the compressible fluid pressure system to store said compressible fluid, means for preventing leakage of compressible fluid from said stuffing box comprising packing in said stuffing box, means for admitting oil through said packing to said rod, oil in said reservoir, a pipe connecting the oil-bearing portion of said reservoir with said means for admitting oil through said packing, and a gear pump adapted to pump back into said reservoir the oil that leaks from said stuffing box.

4. In a closed compressible fluid transmission circuit including a compressor driven by a source of mechanical power and a compressible fluid motor with the compressor discharge connected to the motor intake and the motor exhaust connected to the compressor intake, and a reservoir connected by a pipe to the high pressure side of said compressible fluid circuit, means for lubricating the cylinder of said compressor and said motor comprising oil in said reservoir, a conduit connected at one end to the oil-bearing portion of said reservoir and at the other end to said pipe, said conduit being so shaped that oil does not run out of said reservoir through said conduit by gravity, all in such manner that oil is drawn into said pipe through said conduit only when compressible fluid passes from said reservoir through said pipe.

5. In a closed compressible fluid transmission circuit including a compressor driven by a source of mechanical power, and a compressible fluid motor, with the compressor discharge connected to the motor intake and the motor exhaust connected to the compressor intake, a high pressure reservoir connected by a pipe to the high pressure side of said compressible fluid circuit, and a low pressure reservoir connected by a second pipe to the low pressure side of said compressible fluid circuit, means for lubricating the cylinders of said compressor and said motor comprising oil in said high pressure reservoir, oil in said low pressure reservoir, a conduit connected at one end to the oil-bearing portion of said high pressure reservoir and at the other end to said pipe, said conduit being so shaped that oil does not by gravity run out of said high pressure reservoir through said conduit, a second conduit connected at one end to the oil-bearing portion of said low pressure reservoir and at the other end to said second pipe, said second conduit being so shaped that oil does not by gravity run out of said low pressure reservoir through said second conduit, all in such manner that oil is drawn from either reservoir through the conduit connected thereto only when compressible fluid passes from that reservoir through the pipe connected thereto.

6. In a closed compressible fluid transmission circuit including a compressor driven by a source of mechanical power, and a compressible fluid motor, with the compressor discharge connected to the motor intake and the motor exhaust connected to the compressor intake, and a reservoir connected by a pipe to the high pressure side of said compressible fluid circuit, said compressor and motor being provided with stuffing boxes packing piston rods, means for packing and lubricating said compressor and said motor comprising packing in said stuffing boxes, means for admitting oil through said packing of said compressor stuffing box to the piston rod of said compressor, means for admitting oil through said packing of said motor stuffing box to the piston rod of said motor, oil in said high pressure reservoir, tubing connecting the bottom of the oil-bearing portion of said reservoir with the above-mentioned means for admitting oil through the packings of said stuffing boxes, a conduit connected at one end to the oil-bearing portion of said reservoir at a point above its bottom and at the other end to said pipe, said conduit being so shaped that oil does not run out of said reservoir through said conduit by gravity, but in such manner that oil is drawn into said pipe through said conduit only when compressible fluid passes from said reservoir through said pipe.

7. In a compressible fluid pressure system including a stuffing box packing a rod, means for preventing leakage of fluid from said stuffing box comprising packing in said stuffing box, means for admitting oil through said packing to said rod, a reservoir connected to the compressible fluid pressure system and containing oil, a pipe connecting the oil-bearing portion of said reservoir with said means for admitting oil through said packing, and a pump adapted to pump back into said reservoir the oil that leaks from said stuffing box but incapable of pumping air into said reservoir against the fluid pressure existing therein.

ROBERT C. BURT.